Patented Dec. 28, 1948

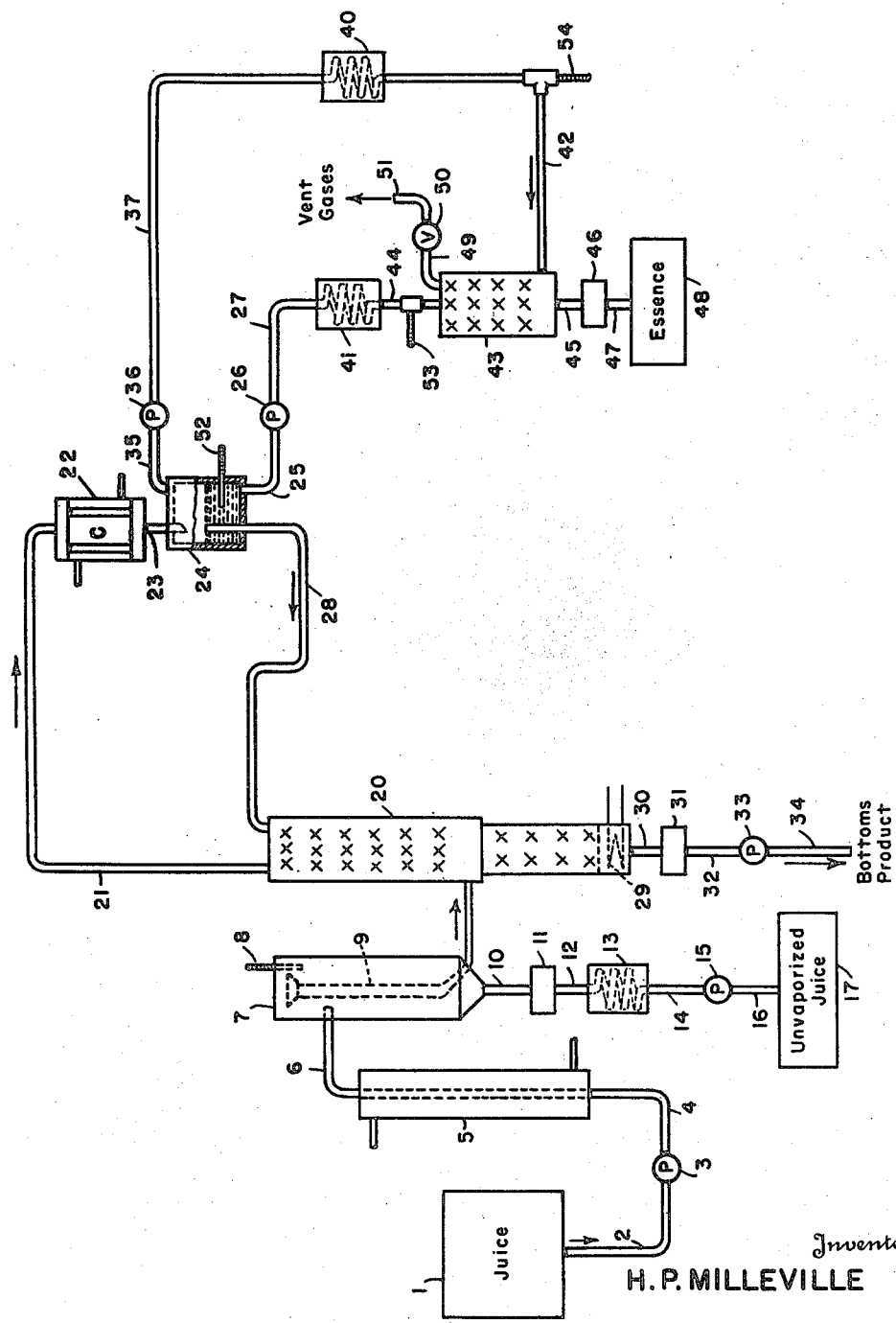

2,457,315

UNITED STATES PATENT OFFICE 2,457,315

VOLATILE FLAVOR RECOVERY PROCESS

Howard P. Milleville, Philadelphia, Pa., assignor to the United States of America as represented by the Secretary of Agriculture Application September 17, 1945, Serial No. 616,953

2 Claims. (Cl. 99—205)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the volatile flavors found in plant products, such as fruits, juices, including fruit juices, plant extracts, and so forth, especially in juices obtained from such fresh fruits as apples, oranges, peaches, strawberries, and grapes. The invention has among its objects the provision of a process for recovering these volatile flavors without significant loss of any of the flavors. It is possible in most instances to recover these volatile flavors by this invention without modification of any of the flavors present in the original material. Modification of flavors, however, is not always detrimental, and in some cases may actually be advantageous, and recovery of the flavors in a modified form can also be effected by the process of the invention.

As used herein, the term "essence" means the aqueous solution of the concentrated volatile flavors, this being the prime product recovered by the process of the invention. By a significant loss of flavors from the process is meant that the "waste products," that is, the noncondensible vent gases and the water resulting from the concentration of the volatile flavors have only a very small quantity of flavor, and no significant loss of flavor results if these "waste products" are discarded. By "modification of flavor" is meant a significant change or difference which can be detected by carefully conducted organoleptic tests when the essence is blended with the unevaporated juice from which it was obtained, together with an amount of water equivalent to that removed in the concentration of the juice, and when this blend is compared to the original juice. By "volatile flavor" is meant those flavor constituents which are removed together with the vapors when a part of the juice is vaporized. Different juices differ in the percentage of the juice that must be vaporized to remove substantially all of the volatile flavor. For ordinary juices, however, this percentage vaporized is between about from 5 to 25 percent.

Essences, concentrated to the order of tenfold without modification or noticeable loss of flavoring, have previously been obtained. By "tenfold essence" is meant a product in which the concentration of the volatile flavor is ten times that in the fresh juice. A tenfold essence is of limited utility, however, first, because its bulk for shipping and storage purposes has been reduced only one-tenth as compared to that of the fresh juice; and secondly, because its dilution effect is so large when added to juice concentrates to produce full-flavored concentrates. Thus, the addition of a tenfold essence, prepared from a fresh juice of 12.5 percent solids, to a juice concentrate of about 80 percent solids results in a full-flavored concentrate of only about 49 percent solids. The addition of a hundredfold essence, on the other hand (which is a product wherein the concentration of the volatile flavor is 100 times that in the fresh juice), to a juice concentrate of about 80 percent solids results in a full-flavored concentrate of approximately 75 percent solids. A concentrate of about 75 percent solids has superior keeping qualities in storage to those of a concentrate of about 49 percent solids, the latter being much more readily spoiled by the action of micro-organisms. Attempts to produce by prior methods essences of higher concentration than tenfold, such as a fortyfold essence, have resulted either in loss or modification of volatile flavors. The essences produced by these prior methods resembled the volatile flavor of the juice from which they were processed, but they lacked the distinctive fresh or natural volatile flavor of the juice. By the process of the invention herein described, essences concentrated at least 25-fold and as much as a hundredfold and higher are easily obtained without significant loss and with or without modification of the flavors.

The exact nature of the constituents that make up the violatile flavors of juices has apparently never been fully described, although certain of the more stable constituents have been identified, as, for example, the amyl esters of apple juice and the methyl anthranilate of grape juice. Although these already identified constituents of the volatile flavor of juices contribute to the natural flavor of the juices, I believe the most important volatile flavor constituents of juices (that is, those which contribute most to the naturalness of the flavor), are, for the most part, as yet unidentified. One of the reasons for this, no doubt, is that the methods of volatile flavor recovery heretofore employed have resulted either in the destruction of the flavors or in their being lost and not recovered with the more stable constituents.

As a result of the process of the invention, concentrated essence containing the volatile flavors of a juice, in concentrated but otherwise unaltered form in a water solution, is made available. Some of its properties having been determined, it now can be understood why some of the previous attempts to recover concentrated essence have been unsuccessful. In these previous attempts, the volatile flavors from a juice were removed by vaporizing a portion of the juice, and the volatile flavors in the vapors were then concentrated by fractional distillation. In order to avoid modifying the flavors by the heating necessary to these operations, they were conducted under vacuum, thus lowering the operating temperature. When the condensate from the fractional distillation was collected, an essence was obtained which resembled the volatile flavor present in the juice yet which lacked its distinctive fresh or natural character. I have found that these missing volatile flavor constituents were lost, for the most part, with the noncondensible vent gases vented through the vacuum pump in the prior art processes.

Dissolved in juices will be found gases (normally the constituents of air) which are not condensible by cooling even to the freezing point of the essence, either because their critical temperature is lower than this freezing temperature or because the total pressure required to condense them is in the range of high-pressure operation, that is, above 100 atmospheres. For example, one analysis of a mixture of the noncondensible gases from apple juice showed it to contain about 17.4 percent of carbon dioxide. In this case, the total pressure required to begin liquefying the carbon dioxide present at the freezing point of the essence would be in excess of 150 atmospheres. The quantity of these noncondensible gases present varies in different juices, and in the experiments upon which this invention is based, the quantity varied from about 1 to 5 percent by volume.

Vent losses of volatile flavors are reduced, of course, by lowering the vent temperature. However, the lowest feasible operating temperature is the freezing point of the essence, which approximates that of water, that is, 32° F. Thus, although the concentration of the volatile flavoring constituents in the essence may be a hundred or more times that in the juice, the actual amount present is probably only a percent or so and may be only a few tenths of a percent, since the amount present in the original juice is estimated to be only a few thousandths of a percent. Therefore, the essence is almost pure water with a small amount of the very strong flavoring constituents, and its freezing point should be approximately 32° F. Moreover, the small amount present of volatile flavoring constituents, even in the concentrated essence, probably is the reason why vent losses can be so significant, whereas in ordinary distillation operations such as the concentration of alcohol from water solution, vent losses are of no consequence.

As stated above, it is believed the reason for lack of success in the use of prior methods in securing a concentrated essence is that the processing was conducted under vacuum and that noticeable losses of volatile flavors in the noncondensible gases were vented from the vacuum pump. The vent losses of volatile flavors for vacuum operation exceed those for atmospheric pressure operation, and the extent of these losses is apparent from the following: For volatile flavor constituents which have a very low vapor pressure at the vent temperature, the loss of these constituents from a system operating at 2 inches of mercury absolute pressure will be about 15 times that incurred at atmospheric pressure at the same vent temperature, since in both cases the vent gases leave the system saturated with volatile flavors. If, in a system operating at 2 inches of mercury absolute pressure the vapor pressure of the volatile flavor constituents at the vent temperature is one-half inch of mercury, then the increase in this loss will be about 20 times, and if this vapor pressure is one inch of mercury, then the increase in loss would be about 30 times. Moreover, if in addition to the noncondensible gases emanating from the juice air leaks into the equipment used for vacuum processing, these figures would then be increased accordingly. If, however, the process used for volatile flavor recovery, or at least that part associated with the venting of the noncondensible gases, is operated under pressure, then the loss would be approximately halved when operating at two atmospheres, reduced to approximately one-third when operating at 3 atmospheres, and so forth.

The volatile flavor recovery process of this invention involves proper combination of the following steps:

1. Vaporization of a portion of the juice which includes the volatile flavors, to separate the vapors containing the volatile flavors from the unvaporized juice;

2. Concentration of the volatile flavors in the vapors by means of fractional distillation; and 3. Recovering the volatile flavors associated with the noncondensible gases.

If desired, modification or alteration of flavor is avoided during steps 1 and 2 by conducting them (a) at a vacuum corresponding to an operating temperature sufficiently low so that no changes occur during the time involved in processing; or (b) at atmospheric or higher pressure, in a processing time so short that, even with the relatively high temperature involved, no changes occur. Changes in the nonvolatile flavor of the unvaporized stripped juice, in separating it from the vapors, are avoided by cooling as rapidly as necessary. This cooling can be effected nearly instantaneously, if desired, by flashing the unvaporized, stripped juice to a pressure lower than that at which step 1 of the process is conducted.

Loss of volatile flavor which occurs with the vent gas is reduced to a negligible quantity, as specified in step 3 by (a) regulation of vapor pressure of the volatile flavoring constituents in the vent gases by controlling the temperature as desired down to the freezing point of the essence if necessary; and/or (b) maintenance of vapor pressure of the volatile flavoring constituents in the vent gas at a low level by venting the noncondensible gases from the system when they are in equilibrium with dilute essence rather than with concentrated essence; and/or (c) maintaining the mol fraction of the volatile flavoring constituents in the vent gas as low as desired by operating the vent system, or equivalent, at a total pressure as high as desired before discharging the vent gases to the atmosphere, which total pressure can be independent of the pressure of the other steps in the process.

Since the vent loss is a product of the mol fraction of the volatile flavoring constituents present in the vent gas and the total number of mols vented (the mol fraction present being equal to the vapor pressure divided by the total pressure and the total number of mols being the sum of the mols of the noncondensible gases plus the mols of the volatile flavor constituents), it is apparent that the same neglibile vent loss could be achieved by different conditions. Thus, venting at a low operating pressure as for example a vacuum, increases the loss compared to atmospheric pressure operation. However, this increase in loss can be compensated for by venting from the process when the essence is a low fold provided that upon further concentration the essence is not allowed to come into contact with air or other noncondensible gas which in turn would have to be vented from the essence-concentrating system and thus would increase the total vent losses.

It has been found that when using apple juice and when venting at a temperature between 32° F. and 70° F., the relationship between the venting pressure and the essence concentration is such that the noncondensible gases carry away a negligible amount of volatile flavor constituents, when the gases are vented from the system in equilibrium with essence of less than 200 A-fold, where A designates the operating or vent pressure in atmospheres. Thus, when venting from a system operating at atmospheric pressure, the maximum concentration of essence obtainable without loss would be 200-fold, and when venting from a system operating at a pressure of a tenth of an atmosphere (3 inches of mercury absolute pressure), the maximum concentration of essence obtainable without loss would be twentyfold. At higher temperatures, the quantity 200 must be decreased, of course, to allow for the increase in vapor pressure of the volatile flavor constituents with temperature. This relationship does not mean that when venting at 40° F. and at one atmosphere pressure at an essence concentration of 200-fold the vent losses are negligible, and that at an essence concentration of 201-fold they suddenly become noticeable. What it is intended to indicate is that the vent losses, under the operating conditions stated, increase as they are vented from more concentrated essences, until in the neighborhood of 200-fold they become significant. Therefore, unless a 200-fold essence has to be produced for some special application, it is better to produce a 150-fold essence and thus to operate within a margin of safety.

This 200-A relationship applies to apple juices which emanate up to 2½ percent by volume (S. T. P.) of noncondensible gases when processed for essence. When the quantity of vent gases is higher, such as 5 percent, then 200-A must be reduced to 100-A. This relationship also applies to grape juice and orange juice, and since the ethereal character of the volatile flavors found in the vent gas is similar for these different juices, this relationship is taken to be a general one, at least for fruit juices.

According to the invention, a process is provided for recovering the volatile flavors of plant products such as fruits, juices including fruit juices, plant extracts, and so forth, particularly fruit juices, in the form of concentrated essences. This process involves vaporizing a sufficient portion of the juice containing substantially all the volatile flavors of the juice and certain noncondensible gases to separate the vapors from the unvaporized juice, fractionally distilling the vapors to separate the essence in vapor form (vapor essence) therefrom, condensing the vapor essence except as to the noncondensible gases present in the vapors and the volatile flavors associated therewith, and then recovering the volatile flavors from the noncondensible gases.

The recovery of the flavors is accomplished, in general, by intimately contacting the noncondensible gases and gaseous volatile flavors with a liquid, preferably the condensed essence itself, thus to wash or scrub out the volatile flavors from the noncondensible gases and place them in solution in the liquid.

In the attached schematic drawing, one embodiment of an apparatus for carrying out the process of the invention is depicted.

Referring to the drawing, the fruit juice or starting material which is to be processed is fed from a container 1 through a pipe 2 into a feed pump 3, which then delivers the juice at a steady, constant rate through pipe 4 into vaporizer 5. The vapor-liquid mixture from the vaporizer where about from 5 to 25 percent of the juice is vaporized, passes through a pipe 6 into a vapor-liquid separator 7. A thermometer 8 inserted in the separator indicates the temperature. Although a preferred method of vaporizing the volatile flavors is to use an evaporator tube without a preheater, other methods can also be used. For example, the evaporator can be operated with a preheater, or the vaporization can be achieved by means of superheating the juice in liquid phase under pressure and flashing it to a lower pressure, or the vaporization may be achieved by stripping out the volatile flavors in a stripping section of a fractional distillation column.

The vapors in separator 7 are led away through a vapor pipe 9, while the unvaporized juice in separator 7 is led through a pipe 10, through a liquid-level controller 11, which may be a float valve, for example, and then through a pipe 12 into a cooler 13, where it is cooled if desired to avoid modification of the unvaporized flavors. The liquid-level controller 11 serves the function of preventing the vapors from entering the cooler 13.

If separator 7 is operating under vacuum, the stripped juice, that is, the portion unvaporized, is pumped out of cooler 13 through pipe 14 by means of a vacuum pump 15 and then discharged through a pipe 16 into a container 17. If the separator is not operating under vacuum, pump 15 can be omitted. The unvaporized juice, when collected, is thus ready for further processing. This further processing, however, is not part of this invention.

It should be noted that, although cooler 13 is depicted as a typical worm coil immersed in a cooling medium, it alternately represents also equipment for cooling by flash-evaporation to a lower pressure than that maintained in the separator. When the juice is cooled by flash evaporation, the cooler 13 becomes another vapor-liquid separating chamber preceded by a flashing orifice and followed by another liquid-level controller. Example III, to be later described, illustrates in greater detail how this may be readily accomplished. This method of cooling is especially advantageous when the stripped juice is to be further processed into a concentrate, as the heat content of the juice is utilized to evaporate-off part of the water of the juice.

The vapors from the vapor-liquid separator 7 (which substantially contain condensible flavors including volatile flavors, water vapor, and certain noncondensible gases) are led away through the vapor line 9 to a fractionating column 20, and in ascending the column, the vapors are rectified; that is, the volatile flavors are concentrated by removal of water vapor admixed with them, the water vapor being condensed and drained to the bottom of the column as bottoms product. The concentrated vapors, containing the volatile flavors and noncondensible gasses but less water, leave the column by means of a vapor line 21 and pass into a condenser 22, where they are condensed except for the noncondensible gases and volatile flavors associated therewith. The condensate passes through pipe 23, collects in a sight-glass box, or chamber 24, from which a fraction is withdrawn at a constant rate through pipe 25, pump 26, through pipe 27 to cooler 41. Thus, if essence is concentrated 150-fold by weight, pump 26 delivers essence at one 150th the weight rate at which the juice feed pump 3 is supplying juice to vaporizer 5. The remainder of the condensate in chamber 24 passes through an overflow into a pipe 28 and is returned as reflux to fractionating column 20. On the way down through the column, the volatile flavors still remaining are stripped out of the reflux and recycled. At the bottom of the column is a reboiler 29 which vaporizes a portion of the water therein contained, thus generating vapor to aid in this stripping operation. Thus, as reflux leaves the column through a pipe 30, it is practically free from volatile flavor. A float valve 31, or other similar means for withdrawing the bottoms product (water removed from the vapors during their concentration by fractional distillation) from the column through a pipe 32 while maintaining the liquid level above reboiler 29, is provided and, in addition for vacuum operation, a pump 33. The bottoms product, which is substantially free from flavor, discharges from a pipe 34 and is usually discarded.

The noncondensible gases dissolved in the raw juice processed are removed from the juice along with the volatile flavors and swept from separator 7 through fractionating column 20 to the condenser 22. They then pass along with the condensate into chamber 24. In this chamber, the gases are separated from the condensate and drawn through pipe 35 by pump 36 into vent-gas discharge line 37 to vent-gas cooler 40 and the condensate is separately cooled by being led through the cooler 41. The vent gases, after being cooled, are led through a pipe 42 into a scrubbing or absorption tower 43, which can be a bubble-plate column or a simple-packed column, while the cooled condensate is also led into this tower through a pipe 44, both the condensate and the vent gases being passed counter-current to each other in the tower. In this scrubbing tower, the volatile flavors are extracted from the noncondensible gases and dissolved in the condensed essence. The essence is then discharged from the lower end of the tower through pipe 45, through a float valve 46 or other means for controlling the liquid level at the bottom of the tower, through pipe 47 into receiver 48, while the vent gases are discharged from the upper end of the tower through pipe 49, through relief valve 50, and then through a pipe 51 to the atmosphere. The pressure in the tower will be maintained not less than atmospheric, valve 50 operating to maintain a pressure above atmospheric if desired. The essence remains in the receiver and is collected therefrom. Thermometers 52, 53, and 54 are used to measure the temperatures of the condensate from the condenser, the condensate after it is cooled, and the vent gas after it is cooled, respectively.

If the vent system is operating at (or above) atmospheric pressure and the fractionating column is at the same pressure (plus, of course, the pressure drop through the connecting lines), the pump 36 may be omitted and in addition, for simplified operation, condenser 22 (assisted by a condensate cooler if desired) may be operated not only to condense the vapors, but also to cool them to the desired vent temperature. Thus, intimate contact of the noncondensible gases with the essence at the vent temperature and vent pressure is secured in the condenser (or subsequent condensate cooler), whereby the volatile flavors are removed from the noncondensible gases, pipe 35 becomes the vent-gas discharge line from the process (above atmospheric pressure a pressure relief value would be required), and pipe 27 becomes the essence-outlet line from the process. This simplified operation is demonstrated by Example I, which will later be described.

Atmospheric pressure operation for the whole process obviously simplifies operations. Pressure relief valve 50 and pumps 15, 33, and 36 are omitted; means 31 becomes a simple float valve or the equivalent; and the pressure at any point in the process is atmospheric plus the fluid-flow pressure drop from that point to the vent discharge. An additional advantage which vaporization at atmospheric pressure has over vacuum vaporization is that the juice so processed is sterilized, at least when processed according to conditions to be hereafter described for apple and grape juice.

When processing a juice such as orange juice, which contains a volatile oil for volatile flavor recovery, it is necessary to modify the condensate system of the fractional distillation column to accommodate a two-phase condensate. This is easily accomplished by making condensate chamber 24 a continuous decanter and by removing the oil phase separately from the system. Under these conditions, the volatile flavor is obtained in two parts, namely, an essential oil and a concentrated water solution (essence) of the volatile flavors.

The process described above may be further varied to achieve substantially the same result, namely, recovery of the volatile flavors. For example, instead of using the scrubbing or absorption tower 43 and the two coolers 40 and 41, the condensate and the noncondensible gases from the condenser can be mixed and intimately contacted and cooled by passage through a single cooler. In this way, most of the volatile flavors associated with the noncondensible gases leaving the condenser can be recovered with the condensate product or essence.

When the flavor-recovery process heretofore described is conducted under vacuum, it is essential that the equipment be as nearly vacuum tight as it is possible to make it. Leakage of air into the equipment increases the quantity of noncondensible gases which must be vented from the system in contact with the essence, and excess leakage will result in substantial losses of volatile flavor.

In the process and some of its variations as just described all the noncondensible gases evolved from the juice in the vaporization step are vented from the process when they are in contact with relatively concentrated essence. The process can be modified, however, so that most of these noncondensible gases are vented from the system when they are in contact with relatively dilute essence with a corresponding reduction in loss of volatile flavors associated with the noncondensible gases. This modification of the process should be particularly applicable to those cases where the vaporization step used to remove the volatile flavors from the plant material is accomplished with a large volume of noncondensible gases, as for example, in dehydration processes. In these cases, the volatile flavors could be scrubbed out of the noncondensible gases by means of, for example, a liquid in an absorption or scrubbing tower and the relatively dilute essence so obtained further concentrated by a fractional distillation process as previously described. Application of this modification of the volatile flavor recovery process to juices themselves may also be advantageous in some cases. In the adaptation of this modification to juices, the vapors containing the volatile flavors and noncondensible gases are separated from the unvaporized juice and then condensed. The noncondensible gases not again dissolved in the condensate so obtained are vented. This condensate, which is relatively dilute essence, can then be further concentrated by a fractional distillation process to obtain a more concentrated essence and the remaining noncondensible gases, now only a small fraction of original quantity, vented from the process. Example IV illustrates this application.

The following examples are illustrative of the invention. In Example I, apple juice is processed for essence, using a single-pass evaporator for effecting the vaporization, operating the entire process at atmospheric pressure, and using the condenser as a means of effecting recovery of the volatile flavors from the noncondensible gases. This example represents one of the simplest applications of my invention.

*Example I*

Freshly pressed juice from 50–50 blend of Stayman Winesap and McIntosh apples screened through a 150-mesh screen is pumped at a steady rate of 50 gallons per hour to a vaporizer which is a single-pass evaporator. This evaporator comprises a single steam-jacketed, stainless steel tube, ¾ inch outside diameter, 0.62 inch inside diameter, and 16½ feet long. Steam pressure in the jacket of this tube is regulated so that about 10 percent by weight of the juice is vaporized, the steam pressure required being less than 50 p. s. i. gauge. Under these conditions, the retention time of the juice in the heater is approximately 15 seconds. This 10 percent vapor fraction is separated from the stripped juice, i. e., the portion not vaporized, in a separator. The stripped juice, leaving the separator at about 215° F., is cooled in a water-jacketed tube cooler upon leaving the separator to about 90° F. in about 20 seconds to prevent modification of the non-volatile flavors, and is collected.

The vapors containing the volatile flavors are passed to a 4-inch inside diameter fractionating column which is packed to a depth of 4 feet with ⅜-inch Raschig rings. At the bottom of the column is a reboiler having a capacity for vaporizing up to one gallon of water per hour at atmospheric pressure. The vapors enter the fractionating column between the reboiler and the packing. When processing apple juice, the stripping section (i. e., the section below the feed) of a fractional distillation column is unnecessary. The vapors are passed through the column to a surface condenser, are condensed, and then cooled to about 70° F. at atmospheric pressure in the condenser. Here, the noncondensible gases are necessarily intimately mixed with the condensate and most of the volatile flavors associated with the noncondensible gas are dissolved in the condensate. The condensate product is then withdrawn at one 100th of the fresh juice weight feed rate (about 0.525 gallons per hour for 50 gallons per hour of juice which has a specific gravity of 1.05), and, since the condensate product contains substantially all of the volatile flavoring constituents, it will be found to be an essence containing the volatile flavors of fresh apple juice concentrated approximately 100 times by weight. The remainder of the condensate is returned to the column as reflux, the bottoms product obtained from the column is discarded, and the noncondensible gases, minus the volatile flavor, are vented from the condenser to the atmosphere.

When the process is conducted as just outlined, it will be found that if the essence is properly blended with the unvaporized, stripped juice, together with an amount of odorless distilled water equivalent to that removed in the fractionating column (1 part by weight of essence to 90 parts of unvaporized stripped juice plus 9 parts of water), no significant difference between this blend and the original fresh juice is detected by carefully conducted organoleptic tests. As evidence that the essence contains all of the volatile flavor, it will be found that if the stripped juice is carefully concentrated under 28 inches of mercury vacuum to approximately 50 percent solids, and this juice concentrate is then reconstituted to juice strength by blending with essence and odorless distilled water, no significant difference between the blend and the original fresh juice can be detected by carefully conducted organoleptic tests.

For reasons of heat economy and more efficient operation, it may be desirable to cool only that part of the condensate withdrawn as essence product and to return the reflux hot, that is, without cooling it more than a few degrees below its condensation temperature. Example II, following, illustrates how this may be accomplished without otherwise altering the product or process.

*Example II*

The same conditions as those in Example I are utilized, except that the condenser is so operated as not to cool the condensate below 200° F. The reflux then is returned to the column at this temperature without further cooling, the height of the fractionating column given in Example I being adequate for operating with either hot or cold reflux. That part of the condensate withdrawn as essence product is pumped through a cooler and cooled to about 70° F. The noncondensible gases from the condenser are also passed through a cooler, cooled to about 70° F., and then passed countercurrent to the cooled essence product in a small absorption or scrubbing tower ¾ inch diameter by 12 inches high and filled with ¼-inch Berl saddles. The top of this tower is vented to the atmosphere to discharge the vent gases, while the essence is withdrawn from the bottom of this tower.

In Example I, the unvaporized stripped juice leaving the vapor-liquid separator at about 215° F. was cooled by passage through a water-jacketed tube. Example III, following, describes how this juice may be cooled almost instantaneously by flashing it into a vacuum. This method of cooling is especially advantageous when the stripped juice is to be further processed into a concentrate, because the heat of the juice is utilized to evaporate-off part of the water of the juice.

Example III

The same conditions and same apparatus of Example I are utilized, except that the stripped juice is no longer cooled by a water-jacketed tube cooler but by flashing it into a chamber maintained at about 1¼ inches of mercury absolute pressure by means of a steam jet evacuator. This chamber is of such a size that it functions primarily as a disengaging space for separation of the main bulk of the liquid from the vapor. Between this chamber and the steam jet evacuator is a conventional high-velocity centrifugal vapor-liquid separator which removes any entrained juice from the vapors before the vapors are evacuated from the system and returns the entrained juice to the chamber. The cooled stripped juice is obtained for further processing by pumping it out of the bottom of the chamber.

In Examples II and III, the vaporization of the juice was effected by the use of a single-pass evaporator. Example IV, which follows, illustrates how vaporization may be effected by superheating the juice and then effecting vaporization by flashing it to a lower pressure, in this case to a vacuum. This example further illustrates how loss of volatile flavors in the vent gas can be kept negligible when operating under vacuum by venting most of the noncondensible gases from the process when they are in contact with relatively dilute essence.

Example IV

Freshly pressed juice from a blend of Stayman-Winesap and McIntosh apples screened through a 150-mesh screen is pumped at a steady rate of 50 gallons per hour into a superheater. The superheater comprises a single steam-jacketed, stainless steel tube, 0.25 inch outside diameter, 0.18 inch inside diameter, and 20 feet long. The steam pressure is regulated so that the juice in liquid phase is superheated up to about 240° F., the steam pressure required being less than 50 p. s. i. gauge, and then flashed to a separating chamber maintained at about 3 inches of mercury absolute pressure, whereupon approximately 10 percent of the juice is vaporized. The superheated juice is flashed at a throttling valve or an orifice so regulated or designed that the pressure drop of the juice flow across it is greater than 4 p. s. i., thus maintaining the juice at about 240° F. in the liquid phase on the superheater side of the flashing valve or orifice. As in Example I, the stripped juice is cooled upon leaving the separator to about 90° F., but since the stripped juice enters the cooler at about 118° F. instead of about 215° F., the cooling time can be increased.

The vapors containing the volatile flavors and noncondensible gases are passed to a surface condenser which is operated to condense the vapors except for the noncondensible gases, and cool them to 40° F., whereupon a relatively dilute essence, that is, approximately a tenfold essence, is obtained. The noncondensible gases are then vented from the process through the vacuum pump used to maintain the process under vacuum and discharged to the atmosphere. The tenfold essence condensate is concentrated to a hundred-fold essence by a fractional distillation process operated at atmospheric pressure. The tenfold essence is pumped to a vaporizer which evaporates all of the essence and delivers the tenfold essence in the form of a vapor to the bottom of a fractionating column which fractionating column and accessories, and the venting system operated in conjunction therewith are identical to the equipment described in Example II. The operations from there on for the production of a hundredfold essence are the same as previously described in Example II.

In the examples given thus far, apple essence was produced at a concentration of 100-fold compared to the volatile flavors in the fresh juice, the vent systems in these examples having been operated at atmospheric pressure. Higher pressures have not been necessary because, at the vent temperatures employed, the amount of volatile flavors carried away by the noncondensible vent gases is negligible when producing an apple essence in which the volatile flavors are concentrated only 100-fold. However, if it is desired, for example, to produce apple essence concentrated 300-fold, it is necessary to operate the vent system under pressure; otherwise, the vent losses of volatile flavor are no longer negligible. Example V, following, describes how the vent system is operated when fresh apple juice is processed for 300-fold essence.

Example V

The same conditions and equipment as that used in example II are utilized, except (1) the condensate is withdrawn as apple essence product at one 300th the weight rate of the fresh juice feed rate and discharged to the vent system at 3 atmospheres pressure; (2) the noncondensible gases are withdrawn from the condenser by a wet-type pump (using the essence as the sealing fluid) which discharges the noncondensible gases to the vent system at 3 atmospheres pressure; and (3) the vent system is operated at a pressure of about 3 atmospheres.

The noncondensible gases are vented to the atmosphere from the top of the tower of the vent system through a pressure-relief valve set at a pressure slightly below 3 atmospheres. The apple-essence product is discharged from the vent system through a valve operated by a liquid-level controller, the liquid level being maintained at the bottom of the tower of the vent system below the noncondensible gas inlet.

The preceding examples have described various ways of applying my flavor recovery process to apple juice. Example VI, which follows illustrates how the process may be applied to Concord grape juice. In the processing of juice from Concord grapes, the grapes are washed, stemmed, crushed, heated to about 140° F. to intensify the flavor and bring out the color, and then pressed on a rack-and-cloth press. The juice so obtained is usually pasteurized at about 180° F. in open kettles. In Example VI, the grape juice is processed for flavor recovery before it is pasteurized. Since the flavor recovery process as given in Example VI sterilizes the juice, it is no longer necessary to have a separate pasteurization step. However, it may still be desirable to heat the stripped juice in open kettles for skimming the scum which floats to the surface.

Grape juice is not ordinarily consumed fresh as is apple juice, probably because until the argols are removed it has too "sharp" a taste. A cooked or modified fresh flavor is thus commonly associated with grape juice. In the preceding example on apple juice, the flavors of the juice were not altered in so far as detectable by organoleptic tests. In the examples that follow, it is not maintained that the flavors are unaltered but that volatile flavors are recovered without substantial loss of volatile flavors with the noncondensible gases and that both the volatile and nonvolatile flavors, if altered, are nevertheless still pleasant.

Example VI

Freshly pressed grape juice is pumped at a constant rate of 25 gallons per hour into the apparatus described in Example I for processing 50 gallons per hour of apple juice. The operations on the grape juice are the same as those given for apple juice in Example I, except that the steam pressure is regulated to vaporize about 25 percent, by weight, of the grape juice processed. The equipment is the same as that described in Example I, except that the fractionating column has a 2-foot-high stripping section of ⅜-inch Raschig rings between the vapor inlet and the reboiler section of the fractionating column.

In the examples for apple juice and grape juice given above, the volatile flavors are water-soluble, that is, they are obtained dissolved in water in the condensate product from the fractional distillation column. Example VII illustrates how my flavor recovery process may be applied to orange juice, the volatile flavors of which are obtained from the fractional distillation column as a two-phase condensate product, namely, an oil phase resembling fresh cold-pressed peel oil, and a water phase which contains the water-soluble, volatile flavoring constituents as well as a trace of the oil phase corresponding to its limit of solubility in the water phase at the decanter temperature. (The oil phase similarly contains a trace of water phase.) The most important fresh orange flavors are modified to what the inventor would consider an undesirable extent by temperature of atmospheric pressure operation; hence, the first two steps of the volatile flavor recovery process (vaporization to separate the vapors from the liquid, and fractional distillation of the vapors) are carried out in Example VII under vacuum. Example VII also illustrated how loss of volatile flavors in the vent gas can be kept negligible when operating under vacuum by contacting the vent gas with essence at atmospheric pressure before it is discharged from the process.

Example VII

Orange juice is passed through a horizontal, single-pass evaporator which has a capacity for evaporating about 15 percent, by weight, of the juice passed through it, using steam at about 15 inches of mercury absolute pressure as the heating medium. The evaporator is so designed that the fluid-flow pressure drop from the inlet end to the separator into which the vapor-liquid mixture is discharged does not exceed about 5 inches of mercury. The unevaporated, stripped juice is separated from the vapors in a conventional type vapor-liquid separator maintained at 1½ inches of mercury absolute pressure, and is discharged from the system by a pump.

The vapors containing the volatile flavors pass to the fractionating column. The column is made up of (1) a reboiler having a capacity for vaporizing at 1½ inches of mercury absolute pressure an amount of water up to about 3 percent by weight of the fresh juice feed rate, (2) a vapor inlet above the reboiler, and (3) an eight-foot section of Berl saddle packing. The vapors pass up through the packing to a surface condenser and are condensed, the condensate passing to a continuous decanter. The oil phase is drawn off from the top of the decanter and discharged from the system by a pump. Part of the water phase is withdrawn as orange-essence product by pumping at one 50th the weight rate of the fresh juice feed and is discharged at slightly above atmospheric pressure to the cooler of the vent system, where it is cooled to about 40° F. The rest of the water phase is returned as reflux to the fractionating column. The noncondensible gases are vented from the condenser by means of a two-stage, wet-type vacuum pump, the water phase of the condensate being used as the sealing fluid at a temperature of 40° F. The noncondensible gases are discharged at slightly above atmospheric pressure to the vent gas cooler of the vent system, where they are cooled to about 40° F. The vent gases are then passed counter-current to the cooled orange essence product in an absorption tower filled with Berl saddles to a height of about 2 feet and are discharged to the atmosphere from the top of the tower. The orange-essence produce is withdrawn from the bottom of the tower and contains the water-soluble, volatile flavoring constituents of orange juice concentrated fifty times, by weight.

When the orange essence is blended with the unvaporized, stripped juice, together with an amount of odorless distilled water equivalent to that removed by the fractional distillation with or without a portion or all of the orange oil recovered in the process, a pleasing fresh-flavor orange juice results.

Example VIII which follows illustrates how a peach essence can be obtained from juice secured from frozen peaches. A method of preparing peaches for use by preserve manufacturers is to freeze ripe peaches with one-fifth part by weight of sugar after they are peeled, pitted, and sliced. If now these frozen peaches are thawed and pressed on a rack and cloth press commonly used in the fruit juice industry, a juice of from 20 to 25 percent solids will ordinarily be obtained. This juice can then be processed for peach essence as described in Example VIII.

Example VIII

Peach juice obtained as just described above is processed for peach essence using the same equipment described in Example II and operating under the same conditions described in Example II, with the following modifications:

Feed rate to evaporator—40 gallons per hour instead of 50 gallons per hour;

Percent vaporized by evaporator—15 percent instead of 10 percent;

Condensate product pump rate—1/50th the feed rate to evaporator instead of 1/100th, thus obtaining a 50-fold essence instead of a 100-fold essence;

Temperatures of condensate product and noncondensible vent gas to the absorption or scrubbing tower of vent system—40° F. instead of 70° F.

The volatile flavors recovered in this peach essence have an odor which very closely resembles that of the peach juice before it was processed. The flavor of the processed unvaporized juice, however, has not only been altered because the volatile flavors have been removed from it, but also because the heating has induced changes in the flavor. It will be found that the processed unvaporized peach juice has a pleasant odor as well as taste very similar to that of canned peaches.

Although fruit juices have been processed for volatile flavor in all of the above examples, I have also discovered that my process is operatable with other juices as, for example, mint leaves extract, strawberry juice, and so forth.

In the foregoing examples, the volatile flavor recovery process was operated continuously. However, it can also be operated batchwise.

Having thus described my invention, I claim:

1. A process for recovering the volatile flavors from a fruit juice, comprising vaporizing a portion of the juice, which vaporized portion contains water vapors, volatile flavors, and noncondensible gases, removing the bulk of the water vapors from the vaporized portion by fractional distillation, condensing the remaining vapors to form a liquid condensate without condensing the noncondensible gases and volatile flavors associated therewith, and recovering substantially all the volatile flavors by contacting the noncondensible gases and gaseous volatile flavors with the liquid condensate at a pressure not less than atmospheric to remove the volatile flavors from the noncondensible gases by dissolving said flavors in the condensate to give at least a 25-fold essence.

2. A process for recovering the volatile flavors of a fruit juice, comprising vaporizing a portion of the juice, which vaporized portion contains water vapors, volatile flavors, and noncondensible gases, removing the bulk of the water vapors from the vaporized portion by fractional distillation, condensing the remaining vapors to form a liquid condensate without condensing the noncondensible gases and volatile flavors associated therewith, refluxing a portion of the liquid condensate, the recovering substantially all the volatile flavors by contacting the noncondensible gases and gaseous volatile flavors with the liquid condensate at a pressure not less than atmospheric to remove the volatile flavors from the noncondensible gases by dissolving said flavors in the condensate to give at least a 25-fold essence.

HOWARD P. MILLEVILLE.

REFERENCES CITED

The following references are of record in the file of this patent:

UNITED STATES PATENTS

| Number | Name | Date |
|---|---|---|
| 1,189,127 | Kellogg | June 27, 1916 |
| 1,367,725 | Trigg | Feb. 8, 1921 |
| 2,098,961 | Fronmuller | Nov. 16, 1937 |
| 2,342,962 | Noyes | Feb. 29, 1944 |
| 2,423,746 | Zahn | July 8, 1947 |
| 2,423,747 | Zahn | July 8, 1947 |